July 11, 1961
L. W. AUSTIN
2,992,387
FUNCTION GENERATOR
Filed June 2, 1958
2 Sheets-Sheet 1
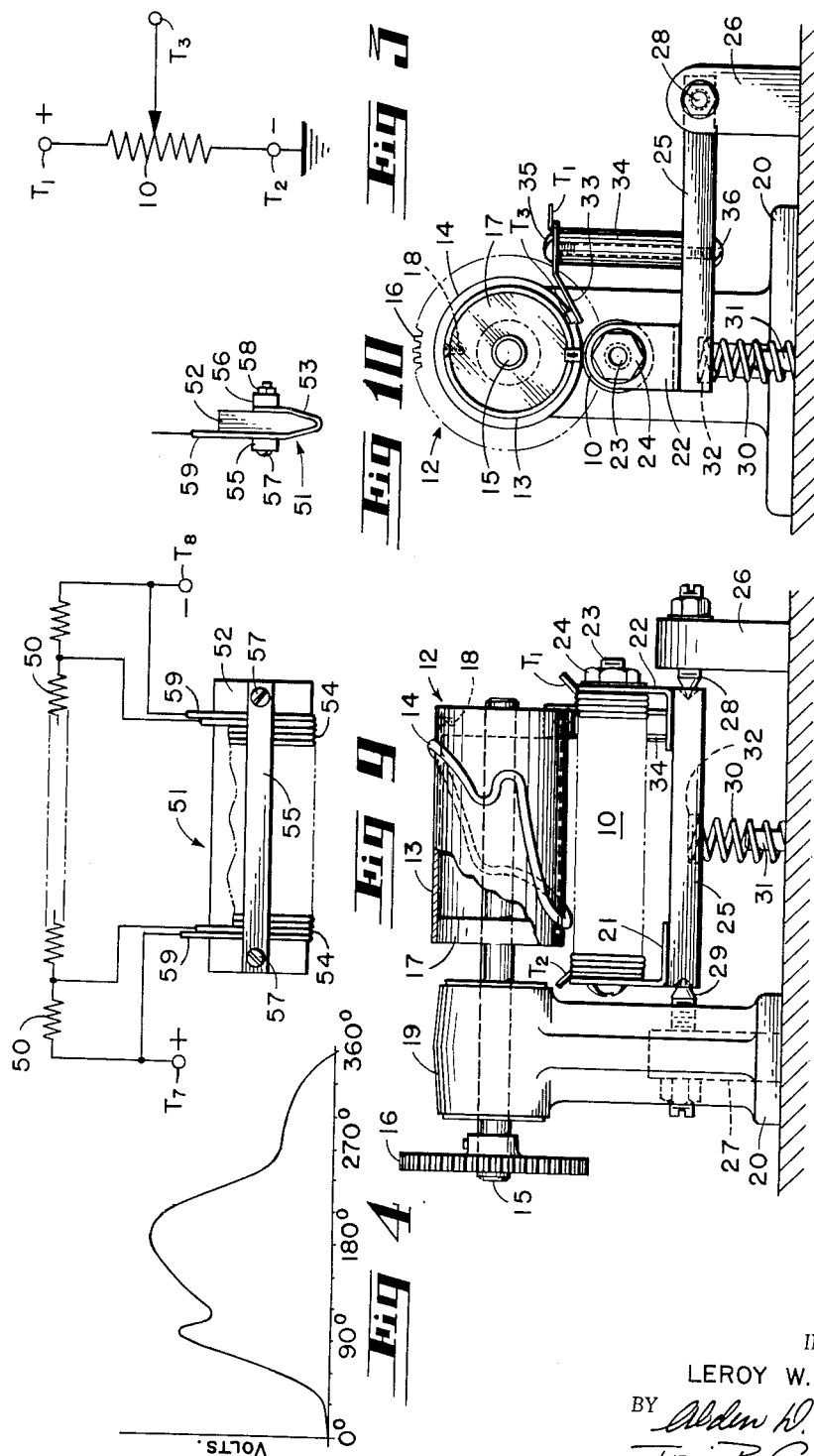
INVENTOR.
LEROY W. AUSTIN.
BY
ATTORNEYS.

July 11, 1961
L. W. AUSTIN
2,992,387
FUNCTION GENERATOR
Filed June 2, 1958
2 Sheets-Sheet 2
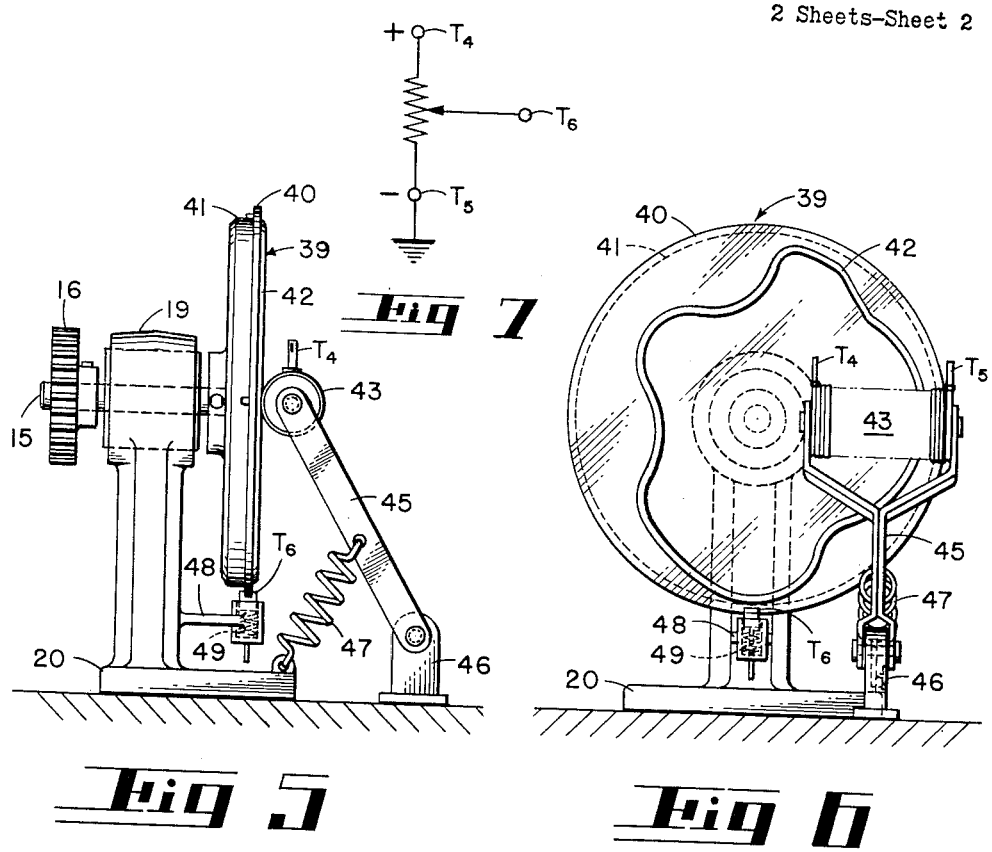
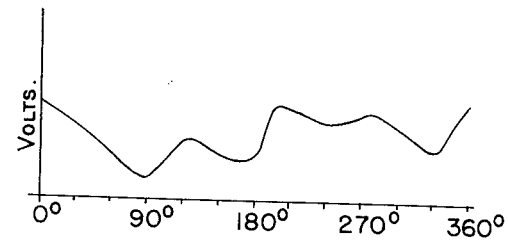
INVENTOR.
LEROY W. AUSTIN.
BY
ATTORNEYS.

United States Patent Office 2,992,387
Patented July 11, 1961

2,992,387
FUNCTION GENERATOR
Leroy W. Austin, Cincinnati, Ohio, assignor to Avco Manufacturing Corporation, Cincinnati, Ohio, a corporation of Delaware
Filed June 2, 1958, Ser. No. 739,359
6 Claims. (Cl. 323—79)

This invention relates to an impedance device for generating variable voltage functions and, more particularly, to a linear impedance element having an inertialess movable contact.

In many applications it is necessary to convert the linear rotation of a shaft into a non-linear voltage function. When the non-linear function is complex, it has been the general practice to wind an electrical impedance element on a form shaped in such a manner that the required function is produced; however, this method is complicated, inaccurate, expensive and time-consuming. Also, rotation of a shaft may be mechanically converted into a non-linear motion by means of cams, gears, etc., but cams and other apparatus used for displacing a movable contact have a considerable amount of inertia and, hence, complex functions are not accurately reproduced.

It is an object of this invention to produce non-linear functions by means of linear impedance elements having an inertialess, movable tap.

Another object of this invention is to generate functions in the form of voltage variations by means of a linear impedance element having a movable tap comprising an elongated, conducting element mounted on the surface of a rotating body.

Still another object of my invention is to generate functions in the form of voltage variations by means of a linear impedance element having a movable tap comprising a continuous, elongated, conducting element mounted on the surface of a rotating cylinder.

Another object of this invention is to generate functions in the form of voltage variations by means of a linear impedance element having a movable tap comprising a continuous, elongated, conducting element mounted on the surface of a rotating disk.

For a better understanding of the nature and further objects of this invention, reference should now be made to the following detailed description and to the accompanying drawings, in which:

FIGS. 1 and 2 are front and side elevations, respectively, of a preferred form of my invention wherein an elongated contact is mounted on the surface of a rotating cylinder;

FIG. 3 is a simplified electrical schematic representing the invention illustrated in FIGS. 1 and 2;

FIG. 4 is a curve showing the voltage function generated by the apparatus of FIGS. 1, 2 and 3;

FIGS. 5 and 6 are front and side elevations, respectively, of a second preferred embodiment of my invention wherein an elongated contact is mounted on the surface of a rotating disk;

FIG. 7 is a simplified electrical schematic representing the invention illustrated in FIGS. 5 and 6;

FIG. 8 is a curve showing the voltage function generated by the apparatus of FIGS. 5, 6 and 7; and FIGS. 9 and 10 illustrate a modification of the structure of the linear impedance element used in accordance with the invention.

Referring to FIGS. 1–3, there is shown a linear impedance element 10 comprised of an insulated winding from which the insulation has been removed along an elongated surface portion to expose turns of wire. Terminals $T_1$ and $T_2$ are provided at either end of the impedance element 10, and a suitable source of potential may be connected thereacross, as shown in FIG. 3. In the instant case, the impedance element 10 is a resistor; it is apparent, however, that an inductor constructed in a similar manner may equally well be used. The exposed turns of wire of the impedance element 10 are positioned to mechanically cooperate with and electrically contact a novel, movable contactor generally indicated at 12.

The movable contactor 12 comprises a hollow cylindrical drum 13 composed of a good conducting material, for example, copper or aluminum. Molded integrally with the drum 13 or brazed or otherwise suitably secured thereto is an elongated, raised tap 14 distributed over the peripheral surface of the drum 13. The tap 14 is also composed of a conducting material and is in direct electrical communication with the drum 13. For removably carrying the drum 13, two disks 17, composed of insulating material, are fixed on a rotatable shaft 15. The drum 13 is secured on the disks 17 by means of a screw 18. The shaft 15 is driven through a gear 16 and is rotatably supported within a conventional bearing structure 19 having a base 20. As will be seen, the impedance element 10 is continuously contacted by the tap 14 along the bare turns of wire and, since the drum 13 is rotated at a constant speed, the tap 14 is, in effect, inertialess.

The impedance element 10 is suitably secured between brackets 21 and 22 by means of a bolt 23 and a nut 24, and each bracket is suitably secured to a platform 25 which is pivotally supported from stanchions 26 and 27 by means of pins 28 and 29. The exposed turns of wire of the impedance element 10 are maintained firmly against the raised tap 14 by means of a helical spring 30. The spring 30 is fixedly mounted in an upright position by means of a fixed vertical post 31 and is retained within a cylindrical depression 32 in the platform 25. A brush contact terminal $T_3$, arranged for continuously brushing the rotating conductive drum 13, is supported from a spring leaf member 33 which is secured to the top of a vertical post 34 by means of a screw 35. The vertical post 34 is, in turn, mounted on the platform 25 by means of a screw 36.

As indicated in FIG. 3, a source of potential is connected across the terminals $T_1$ and $T_2$ of the impedance element 10. With the shaft 15 driven at a constant rate, a voltage output is derived at the brush contact terminal $T_3$ as represented by the curve in FIG. 4. It is to be understood, however, that the shaft 15 may be driven at varying speeds, and in that case the resultant curve will be a function of shaft position, rather than time.

A second preferred embodiment of this invention is illustrated in FIGS. 5–8. In this embodiment the rotating drum contactor 12 is replaced by a rotating disk contactor, generally indicated at 39. The contactor 39 comprises a disk 40 also composed of a good conducting material and fixedly mounted on an insulating support member 41. An elongated, raised contact portion 42 is integrally molded, soldered, brazed, or otherwise secured to the face of the disk 40. As in the first embodiment, the entire contactor 39 is mounted on the shaft 15 for rotation in the bearing 19 and is driven through the gear 16.

The impedance element employed in this embodiment is a resistor 43 comprised of a plurality of insulated windings from which the insulation has been removed along an elongated portion to expose the bare resistance wires. The resistor 43 is provided with a pair of terminals $T_4$ and $T_5$, and a source of potential is connected thereacross (as shown in FIG. 7). The impedance element 43 is mounted at one end of a bracket 45, the other end of which is pivotally secured to a fixed support 46. The exposed windings of the resistor 43 are continuously maintained in firm contact with the raised tap 42 by means of a helical spring 47 secured at one end to the bracket 45 and at the other end to the base 20. For deriving an output voltage a brush contact terminal $T_6$, supported from the bearing 19 by means of an arm 48, is loaded by means of a spring 49 and positioned to cooperate with and continuously brush the peripheral edge of the disk 40. With the raised contact portion 42 distributed on the disk 40, as shown in FIG. 6, the output derived at the brush contact terminal $T_6$ will be substantially as shown in FIG. 8.

The embodiments illustrated in FIGS. 1 and 2, and in FIGS. 5 and 6, perform very satisfactorily in those cases where the resistance wires of the impedance elements 10 and 43 are heavy enough to withstand the constant friction of the continuously rotating taps. However, in many applications the life span of the resistance wires is too short for practical applications, and for that reason the impedance element shown in FIGS. 5 and 6 was substituted for the elements 10 and 43.

In the embodiment of FIGS. 9 and 10 (Sheet 1) a plurality of identical fixed resistance elements 50 are series-connected between a suitable source of potential connected at terminals $T_7$ and $T_8$. For deriving a variable voltage function, I provide a novel commutator, generally indicated at 51, for continuously contacting the rotating disk or drum and thus tapping off the desired function from the resistors 50. In a device reduced to practice and run continuously for many days, one hundred resistors, each having a resistance value of 100 ohms, produced very satisfactory curves and recorded voltage steps of only one percent.

The commutator 51 is comprised of a form 52 having a beveled edge portion 53 on which the individual commutator segments 54 are positioned. To form the segments a continuous, insulated wire, having one more turn than there are resistors 50, is wound on the form 52. The insulation of the wire at the beveled edge is then removed to expose the bare wire, and a pair of clamps 55 and 56 secure the continuous wire by means of bolts 57 and nuts 58. The edge of the clamp 56 then provides a guide for severing each turn of the winding, thus producing the segments 54, each having a connecting end 59 for making the necessary connections, as shown, to the junction of adjacent resistors 50.

If the commutator 51 is then substituted for the impedance element 10 in FIGS. 1 and 2, or for the impedance element 43 in FIGS. 5 and 6, and if the beveled edge 53 is positioned to engage the raised contact portion, a voltage curve is derived which will be substantially the same as that shown in FIGS. 4 and 8.

By means of this invention as disclosed in each of the embodiments, many complex functions in addition to those shown in FIGS. 4 and 8 may also be derived. For example, a sawtooth wave may be generated having a zero flyback time, a staircase voltage, a pure sine wave, or circular, hyperbolic, exponential, and many other functions may also be produced with extreme precision. Also, more than one cycle of a particular function can be reproduced for each revolution of the rotating body.

Moreover, while there are disclosed embodiments employing a rotating drum and a rotating disk, other surfaces as, for example, a conical, spherical, or even spiral surfaces may also be desirable for particular applications.

Many other modifications and adaptations will be readily apparent to persons skilled in the art, and it is intended, therefore, that the invention be limited only by the scope of the appended claims as read in the light of the prior art.

What is claimed is:

1. In apparatus for generating a varying voltage function, the combination comprising: an impedance element having a plurality of laterally spaced adjacent electrical taps; a source of direct voltage potential connected across said impedance element; a conductive body; an elongated conducting material positioned on the surface of said body in accordance with a predetermined function; means mounting said contacts adjacent the surface of said body and biasing said contacts against said elongated conducting material; a conductive brush continuously contacting said conductive body; and means for continuously rotating said body whereby said elongated conducting material selectively engages said contacts, and whereby a cyclically varying function is derived from said conductive brush.

2. The invention as defined in claim 1 wherein said impedance element is linear.

3. The invention as defined in claim 2 wherein said impedance element comprises a plurality of equal series-connected resistors, the junction of each adjacent resistor being connected to a tap.

4. The invention as defined in claim 3 wherein said taps comprise the adjacent turns of an insulated wire wound on a form having a straight edge, the electrical continuity of each of said turns being severed, and the insulation on the surface of said wire at said straight edge being removed to expose adjacent bare wires.

5. The invention as defined in claim 1 wherein said conductive body comprises a cylinder and wherein said conducting material is positioned on the peripheral surface of said cylinder.

6. The invention as defined in claim 1 wherein said conductive body comprises a disk and wherein said elongated conducting material is positioned on a flat face of said disk.

References Cited in the file of this patent

UNITED STATES PATENTS

| | | |
|---|---|---|
| 2,003,024 | West | May 28, 1935 |
| 2,062,915 | Lamb | Dec. 1, 1936 |
| 2,554,811 | Bromberg et al. | May 29, 1951 |
| 2,761,102 | Brown | Aug. 28, 1956 |
| 2,820,871 | Smith | Jan. 21, 1958 |
| 2,835,773 | Sawyer et al. | May 20, 1958 |
| 2,903,679 | Gilliam | Sept. 8, 1959 |

FOREIGN PATENTS

| | | |
|---|---|---|
| 396,986 | Great Britain | Aug. 17, 1933 |